(12) United States Patent
Mustybrook

(10) Patent No.: US 6,866,328 B1
(45) Date of Patent: Mar. 15, 2005

(54) VEHICLE DOOR OPENER AID

(76) Inventor: Dionna Mustybrook, 5708 Carlson Dr., Sacramento, CA (US) 95819

( * ) Notice: Subject to any disclaimer, the term of this patent is extended or adjusted under 35 U.S.C. 154(b) by 0 days.

(21) Appl. No.: 10/728,554

(22) Filed: Dec. 8, 2003

(51) Int. Cl.$^7$ .................................................. B60J 3/00
(52) U.S. Cl. ........................................ 296/152; 296/75
(58) Field of Search .......................... 296/146.1, 146.7, 296/146.9, 148, 149, 152, 153, 39.1, 37.13, 75; 49/502, 460

(56) References Cited

U.S. PATENT DOCUMENTS

| | | | | |
|---|---|---|---|---|
| 1,486,566 A | * | 3/1924 | Crecelius | 296/152 |
| 3,610,684 A | * | 10/1971 | Richter | 296/132 |
| 4,819,984 A | * | 4/1989 | Wylie | 296/152 |
| 5,076,870 A | * | 12/1991 | Sanborn | 296/146.7 |
| 5,529,370 A | * | 6/1996 | Veit | 296/152 |
| 5,542,736 A | * | 8/1996 | Kondo | 296/152 |
| 6,733,066 B1 | * | 5/2004 | Valdez | 296/152 |

* cited by examiner

Primary Examiner—Lori L. Coletta
(74) Attorney, Agent, or Firm—Mark C. Jacobs

(57) ABSTRACT

A device for thrusting a car door open by a driver which device mounts either directly to a vehicle door panel, or if the vehicle door has an inwardly projecting storage pocket, the device mounts on the pocket. The device includes a main body which receives a pad adapted to be impacted by a driver's foot. The main body is attached to the vehicle door by at least two spaced upper hooks on the rear face which hooks engage a respective aperture in the door panel or pocket, and by at least two rotatable tab pegs. The main body includes a forward facing perimeter edge to define a frame for the impact pad which is removably attached therein. The impact pad is disposed within the frame perimeter after the main body is attached to the pocket or the door panel by adhesive or by hook and loop closure members.

12 Claims, 4 Drawing Sheets

VEHICLE DOOR OPENER AID

This application discloses and claims subject matter related to that which was disclosed in my earlier filed U.S. patent application Ser. No. 10/292,967 filed Nov. 13, 2002.

FIELD OF THE INVENTION

This application pertains to a device to be used primarily by short people to aid them in the opening of a vehicle door, and especially the front door of a two-door car. The device is intended primarily for use on two-door vehicles due to the relatively heavier weight and larger size of the front door of two-door cars or trucks.

BACKGROUND OF THE INVENTION

Applicant is a woman of short stature and with arms and legs appropriate for her just over five feet height. As a successful businesswoman, she finds herself driving an imported sporty low to the road two-door vehicle. Being an upscale car, it has very heavy doors, and she being of proportioned size but short in stature, finds it difficult to push the door open far enough to exit the vehicle with grace. She has found that both men and women who are height challenged have arms that are too short to push the door open wide enough to be able to easily exit. Therefore, applicant discovered the need for an aid in opening the car door. An aid that could be easily attached to the vehicle, but which would not detract from the potential resale value of the vehicle and which would be easily installed, preferably with only household tools.

Applicant found that through her research there were no products on the market that would serve to help people with short arms and short legs to easily open the car or truck door such that they could exit the vehicle. She also discovered that in certain cars, where the driver medium height or short- is seated low to the ground, exiting of the vehicle is also more difficult. Thus, the need for a foot-based aid for exiting vehicles was recognized. A search carried out on this subject matter revealed little or no art on the specific subject.

The following patents turned up, none of which anticipates and none of which in combination renders the invention of this application obvious.

5,542,736 KONDO 5,529,370 VEIT 5,076,870 SUNBORN 3,610,684 RICHTER 1,486,566 CRECELIUS

The invention accordingly comprises the device possessing the features, properties, the selection of components which are amplified in the following detailed disclosure, and the scope of the application of which will be indicated in the appended claims.

For a fuller understanding of the nature and objects of the invention, reference should be made to the following detailed description, taken in conjunction with the accompanying drawings.

SUMMARY OF THE INVENTION

The invention of this application is a low-cost device that mounts either directly to a door panel of a vehicle, or if the vehicle has an inwardly projecting pocket for the storage of miscellaneous vehicle related items, the device mounts on the pocket of the vehicle door. The device includes a main body which receives a pad adapted to receive the impact of one's foot. The main body is attached to the vehicle door by at least two spaced upper hooks on the rear face which hooks engage a respective aperture in the door panel or pocket, and by at least two rotatable tab pegs. The main body includes a forward facing perimeter edge to define a frame for an impact pad or impact-receiving layer.

An adhesively removable impact pad is disposed within the frame perimeter after the main is attached to the pocket or the door-panel. A Velcro® brand closure may also be used to attach the impact pad to the main body.

It is a first object of this invention to provide a device which mounts directly to a door panel or mounts to a pocket of a vehicle door to aid the driver or passenger to open the door.

It is another object to provide a device that attaches to a vehicle door and which is used in combination with foot action to open the vehicle door to the extent desired.

It is a third object of this invention to provide a device which aids in the opening of the door and which is installed in a nonpermanent fashion.

It is a fourth object to provide a device to aid short drivers in opening a car door and which will not damage the pocket or panel of the vehicle to which it is attached.

Other objects of the invention will in part be obvious and will in part appear hereinafter.

DESCRIPTION OF THE PREFERRED EMBODIMENT

Figure 1:
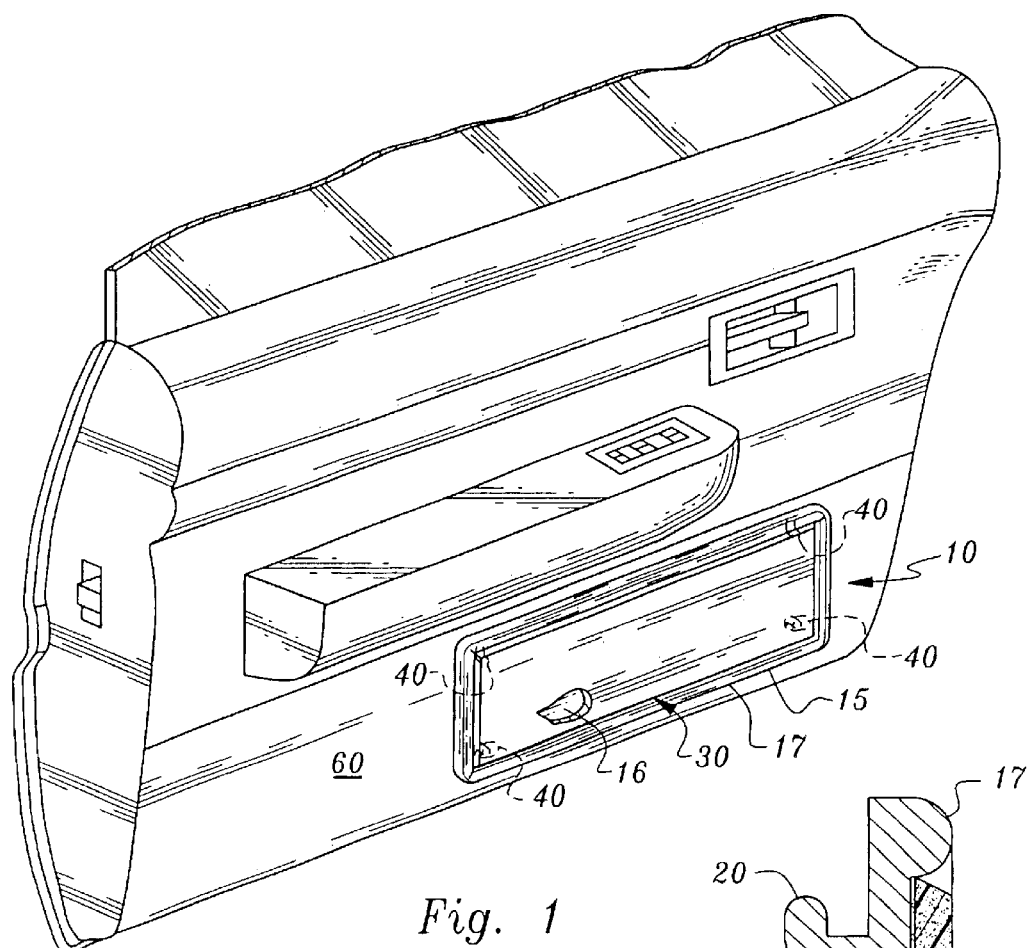
FIG. 1 is a front view of this invention, mounted on a car door panel.

The device 10 of this invention comprises three main portions, the main body 15, the removable cover member 30, and the rotatable tab peg 40. The reader is first directed to FIG. 1. Here the main body 15 of the device 10 is seen. Main body 15 comprises a backer panel 16 having an upstanding, generally rectangular framework 17. Typically, framework 17 may be a decorative picture frame moulding of about 0.25 inches in elevation, which framework is glued on, screwed to, or otherwise attached to the periphery of the backer panel 16.

In the alternative, the framework 17 may be integrally formed with the backer panel 16 as by moulding, or casting of metal or plastic. If made of plastic, any desired color may be employed that color keys to the door panel 60 seen in FIG. 5.

Shown disposed within the main body portion is the removable cover member 30. This member 30 comprises an impact pad which is an impact absorbing layer 32, which is a kick panel made of high impact plastic, elastomer, or rubber having an adhesive layer 31 thereunder. The removable cover member 30 is sized to be slightly smaller in length and height so as to easily fit within the confines of the perimeter framework 17, such that it adhere smoothly to the backer panel 16 without rippling.

The reason a peelable or removable adhesive is desired is that when the kick panel 32 gets dirty, as by scuffing from the heels and soles of shoes, it can be peeled away, discarded; and replaced with a fresh clean cover member 30.

Figure 2:
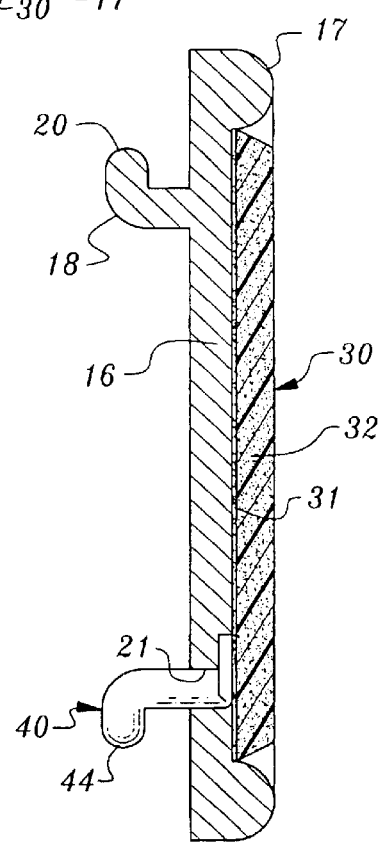
FIG. 2 is a side sectional view of this invention, unmounted.

Seen in FIG. 2, is mount hook 18 to be discussed infra in more detail. Also seen, in the lower right-hand cutaway area, is an RTP or rotatable tab peg 40; details on the RTP will also be discussed below.

In FIG. 2, a side sectional elevational view of the cover member 30 is seen disposed within the framework 17 disposed on the obverse surface of the back panel 16. A mount hook 18 having an upwardly extending tip 20, projects rearwardly and upwardly from the reverse side surface of the back panel for engagement in a manner to be set forth elsewhere herein with a vehicle door. A rotatable tab peg 40 is so named because the head or tab is able to pivot 90 degrees on a bend in its structure. See infra. An RTP is disposed through a bore 21 that passes through the backer panel. As can be seen, the tab here has been rotated such that it lies neatly in the aligned recess 19, seen in FIG. 6, within the lower, area of the backer panel 16.

Figure 3:
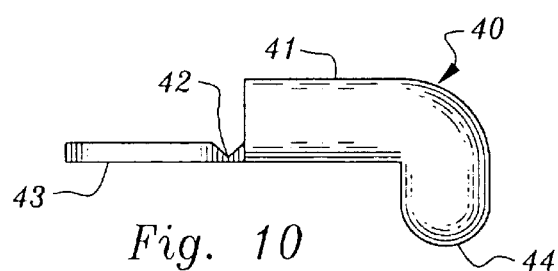
FIG. 3 is an enlarged view of a rotatable tab peg forming part of this invention.

In FIG. 3, one of the rotatable tab pegs 40 is seen. It has an elongated shaft 41 which terminates at the distal end in a boss 44 disposed at an offset angle which boss 44 serves as a locking mechanism as will be discussed. At the proximal end of the shaft 41 is head 43. The head, which optionally may have a bore there through for weight reduction, is connected at the score line interface 42 to the shaft 41. When the RTP is inserted, the peg is rotated such that the boss is disposed in a downwardly direction. The combination of the hooks being placed in the upper bores on the door or pocket of the door at an upward angle and the RTPs when rotated to a downward angle locks the device to the door or pocket securely. This is of benefit when a small force is applied to remove the cover layer. It will come off no matter how attached without removing the main body portion.

Figure 4:
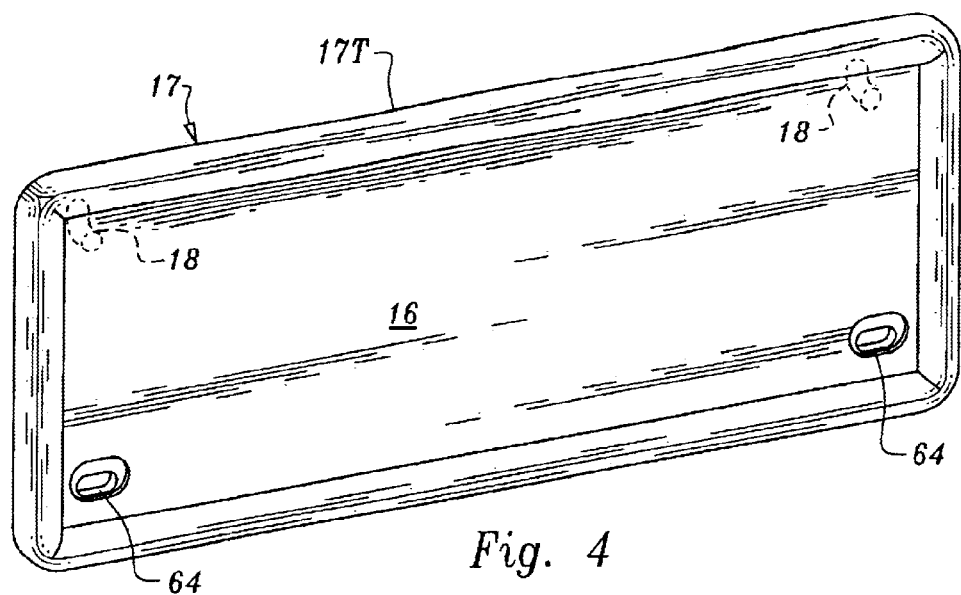
FIG. 4 is a front perspective view of the main body proton of this invention.

FIG. 4 is a front perspective view of the back panel 16 with the perimeter or periphery framework 17 thereon. The back panel 16 has an obverse, and a reverse side, and as shown here has a pair of hooks 18 disposed on the reverse side, as is seen best in FIGS. 3 and 10. These hooks are disposed in a plane parallel to the top edge of the framework 17, designated 17. The back panel also has a pair of through bores 64 equally spaced below the hooks 18 for the receipt of RTPs as will be described elsewhere herein. The shape of each member of the framework 17 can be of any configuration known. Just as in picture frame moulding there is an unlimited selection, here too, the shape of each member may be as individual as the driver. It is recommended however that the elevation, the dimension views from the surface of the back panel 17 toward the driver, should preferably be in the area of ⅛ to ¼ inch, such that the framework does not protrude more toward the driver than does the back panel 16 with the cover member 30 disposed within the framework. This suggestion is made both for aesthetics, and because there are space limitations between the side edge of the seat and the door panel or the door panel's pocket. If the framework is too elevated, the door might not close due to impacting the side of the seat.

Figure 10:
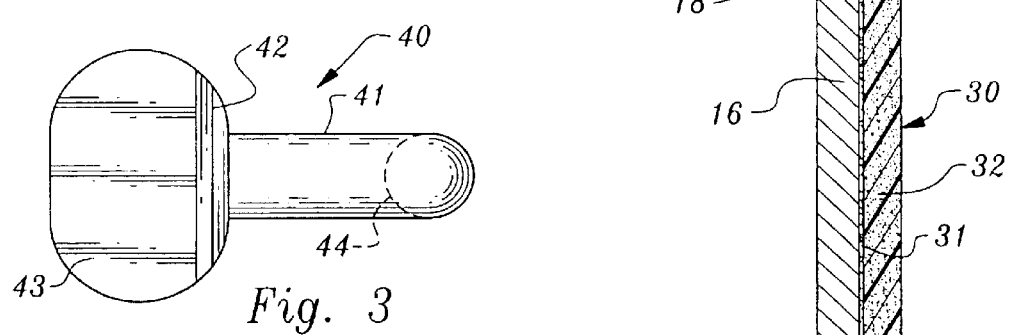
FIG. 10 is a view related to FIG. 3, but with the tab in the folded position.
Figure 6:
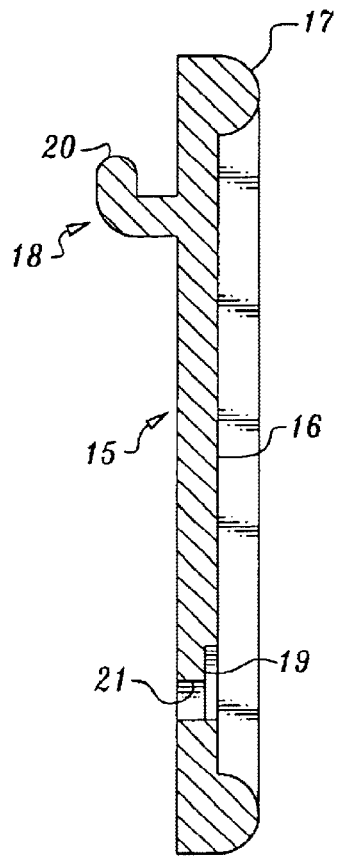
FIG. 6 is a left sectional view of the back panel portion of the invention, prior to the placement of the rotatable tab peg thereon.

FIG. 10, the head has been bent ninety degrees along the score line 42 to enable the head 43 to fit snugly within the confines of the bore aligned recess 19, as per FIG. 6, subsequent to insertion of the peg through one of the bores 21. In essence, the recess 19 has the bore 21 therein.

Figure 5:
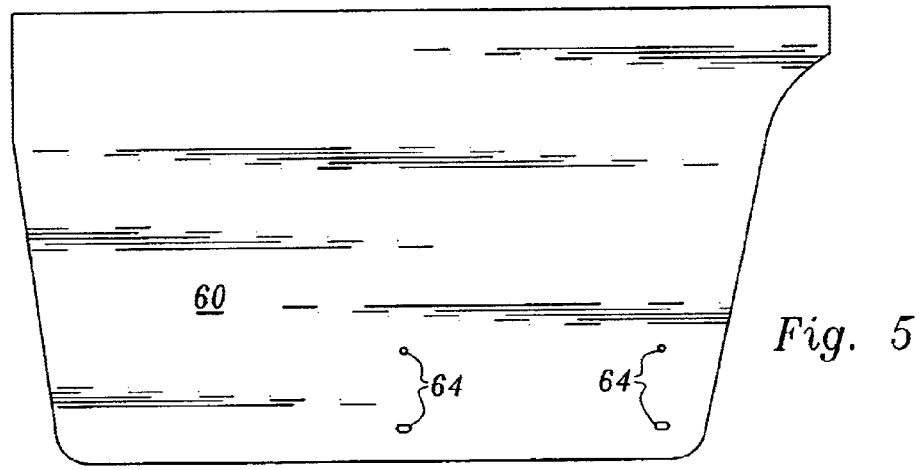
FIG. 5 is a front elevation view of a vehicle door panel modified to receive this invention.
Figure 9:
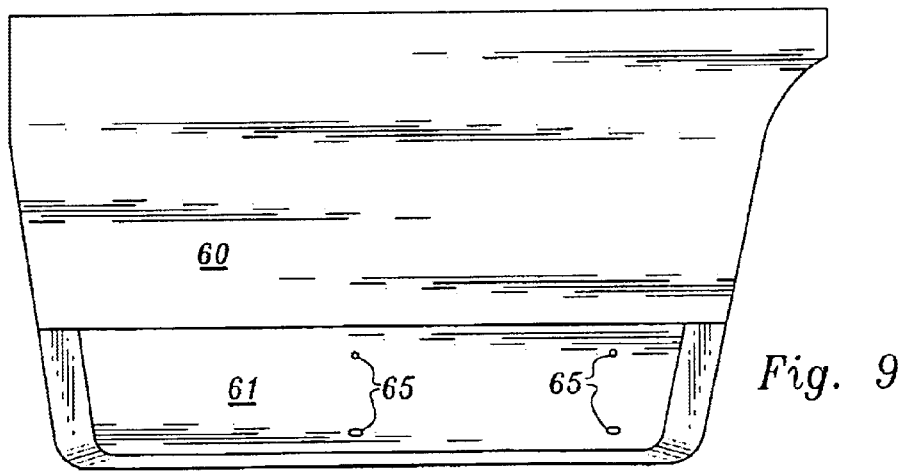
FIG. 9 is a front elevation view, related to FIG. 5, but of a door panel with a pocket thereon, and modified to receive this invention.

Having generally described the invention 10, the discussion now moves to the door panel 60 seen in FIG. 5, and to the pocket 61 mounted on the door panel 60 shown in FIG. 9. First, on the door panel 60, a series of spaced bores 64 are drilled through the door panel and its upholstery for the mounting of the device. There are at least two upper bores and at least two lower bores, to ensure that no sag occurs during the mounting of the main body to the door or pocket.

But in FIG. 9, the door panel has a conventional pocket 61 mounted thereon. Here the apertures 65 to mount the device are made in a rectangular pattern in the pocket 61, though they need not be. Holes 64 and 65 are the same just on a different surface. Bores 64 are in the panel, apertures 65 on the pocket. While two are suggested on each row, an additional bore for an additional hook or RTP may be employed. The use of but one hook and just one peg, while operable is not recommended.

Figure 7:
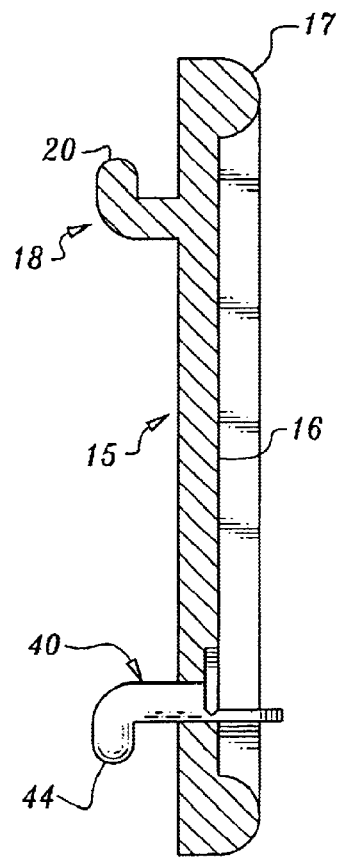
FIG. 7 is a left side elevational view of the back panel portion of this invention, after the rotatable tab peg has been inserted therein.

FIGS. 6 and 7 are side cutaway views of the main body 15, showing the perimeter framework 17. This framework maybe integrally formed with the back panel 16 or attached thereto as by glue, screws, welds or rivets depending upon the material used for the framework and the back panel 16. A recess 19 is optionally but preferably formed in the lower area of the back panel 16, aligned with each lower bore 21 through which the boss and shaft of the respective RTP will pass for engagement. In FIG. 7, an RTP is shown already inserted through the back panel's aperture 21, and the head 43 has been rotated from the position of FIG. 3 to the position of FIG. 10, by bending the tab along bend 42 such that the thickness of the tab fits flush in the recess 19. It is seen that there is a gap between the boss 44 and the rear surface of the back panel 16, and the reason for this is the absence of the pocket or door panel in this view.

Figure 8:
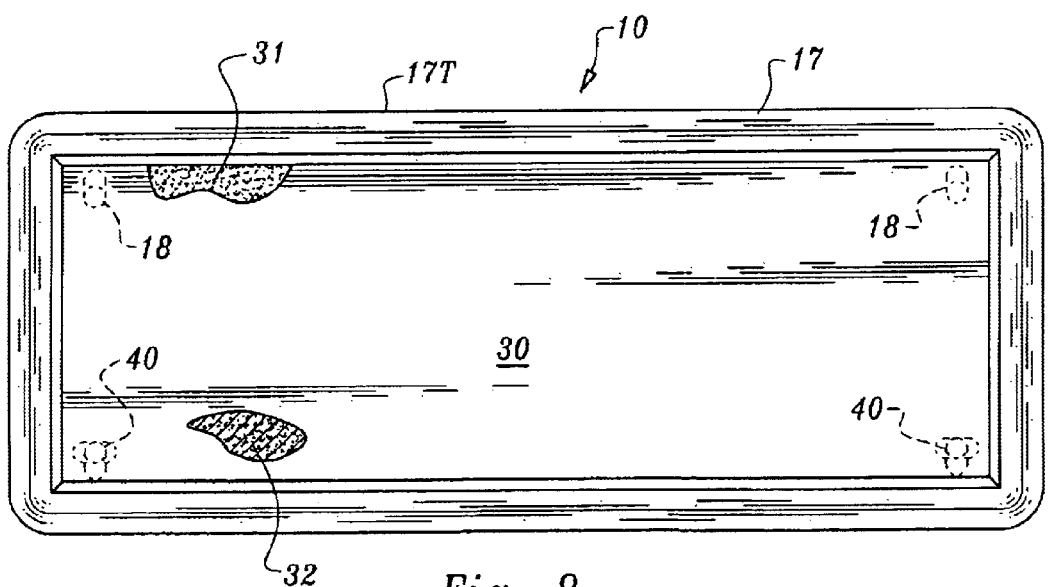
FIG. 8 is a front elevational view of the back panel portion of this invention.

In FIG. 8, there is seen a front view of an assembled unit of this invention. Here the cover member 30 having an adhesive layer 31 disposed on the underside of a sheet of flexible foam or other impact absorbing material of pad 32 is seen. This sheet material may be hard rubber, or polymeric plastic sheeting, such as of polyurethane foam or elastomer. Other materials capable of absorbing the impact of the shoe heel or sole of a driver may be used, such as but not limited to polycarbonate, or ABS, both hard plastics, or soft material such as sponge, cork or carpetin g.

FIGS. 9 and 10 both related to other figures have been previously discussed.

Assembly

Figure 11:
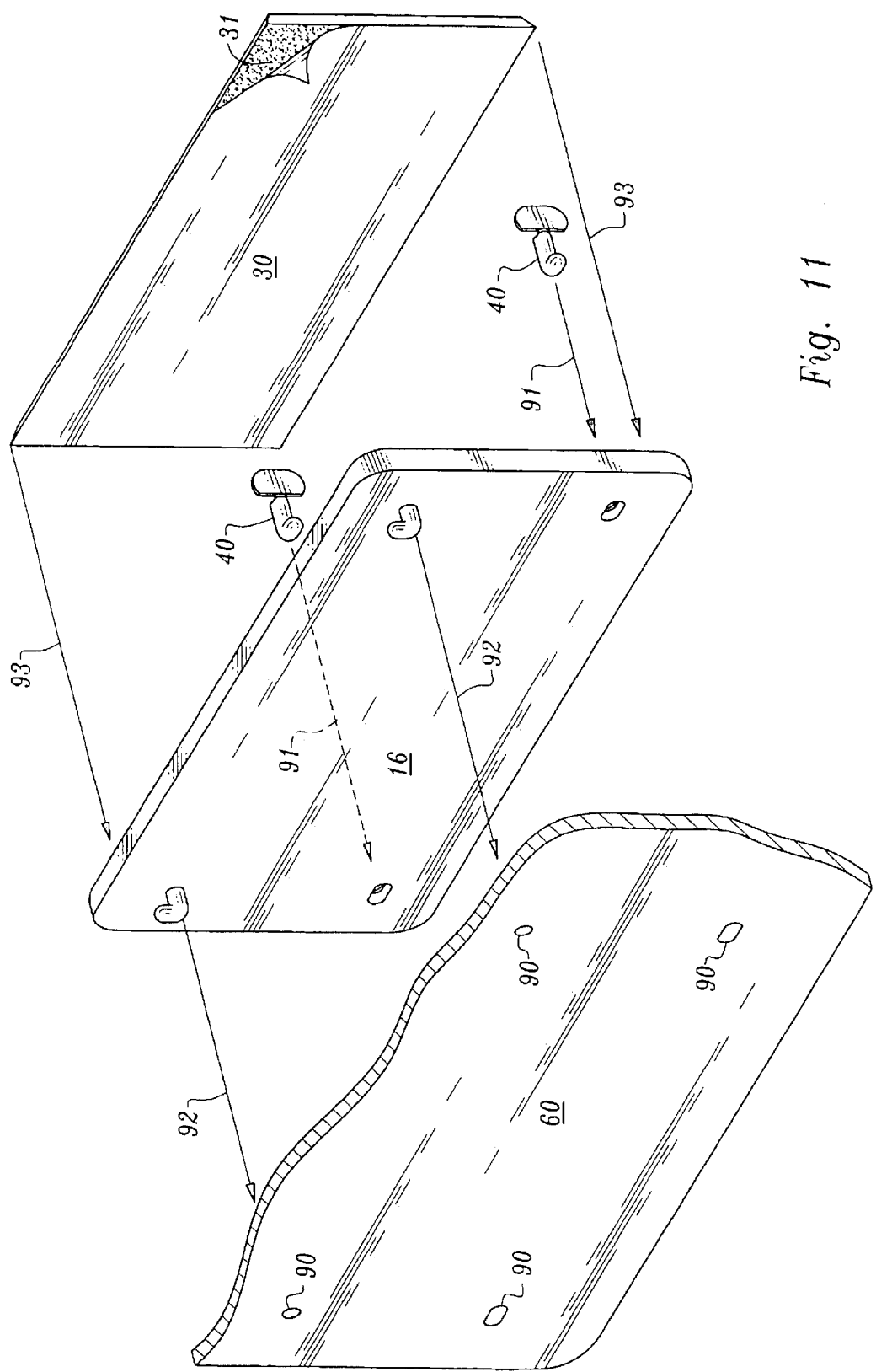
FIG. 11 is a diagrammatic view that illustrates the order of assembly of this invention.

FIG. 11 is a diagrammatic view that illustrates the assembly of this invention. The first step 90 is to drill the four holes or six holes as may be desired in the door panel 60 or the door panel pocket, not seen here. The second step, step 92, is to place the two hooks 18 seen in FIG. 2 into the two upper bores just provided in the door panel to partially attach the back panel 16 to the door 60. These hooks are inserted such that each hook end is at an upward disposition. Next is step 921, the placement of the RTPs 40, in the bores 21 see also FIG. 7, and through the cover member 16. The RTPs are inserted and then rotated such that the boss on each is rotated downwardly to lock the main body 15 to the door or door pocket. This completes the attachment of the back panel to the door or pocket thereof. Next the step 93 is to removably attach, preferably removably adhese, the cover member 30 within the defined frame on the back panel.

Typical thickness for the back panel will vary with the nature of the material. But if plastic, ⅛ to ¼ inch thickness should suffice and if metal, ⅛ inch is more than adequate thickness. There is no criticality to the thickness of the impact pad, but sheeting of ⅛ to ¼ inch should be adequate to absorb the shock from the foot hitting this layer. Removably attachable adhesive is available in the marketplace from several vendors including the 3M® company. The alternate hook and loop attachment for the impact absorbing layer is sold under the brand Velcro® among others. The impact receiving layer, (pad) can also be removably attached to the back panel by two-part snaps but this is less preferred to Velcro® or adhesive.

While the back panel and the main body comprising the back panel and the periphery framework may be made in any color, it is aesthetically more pleasing if they match the color scheme of the vehicle interior, be it a car, truck or SUV. The impact receiving cover member may also be color keyed to the vehicle interior.

The cover members may be hand washed and reused, or they may be made to be throwaways with easy replacement.

While the device is preferably rectangular in configuration, with the longer dimension running between the vertical sides of the vehicle door, round, hexagonal, square and other shapes are also contemplated for this invention. It is also to be seen that while the two sets of bores on the vehicle door are designated upper bores and lower bores, the spacing between the two of the upper set and the two of the lower set need not be the same, but may be. The only requirement is that the upper set aligns with the location of the hooks and the lower set on the door or pocket aligns with the location of the bores on the back panel through which pass the RTPs.

It is seen that I have provided a low-cost device to aid height challenged persons, and especially those with short arms to push open a heavy car door with their foot. The device works especially well in a two-door car which has oversized front doors to permit access to both front and back seats.

Since certain changes may be made in the described apparatus without departing from the scope of the invention herein involved, it is intended that all matter contained in the above description and shown in the accompanying drawings shall be interpreted as illustrative and not in a limiting sense.

I claim:

1. A device to aid a person to open a vehicle door, and which device is to be attached to the upholstered vehicle door or to a pocket mounted on said door which device comprises:

a main body comprising a back panel having an obverse and a reverse side surface, with a forwardly extending peripheral framework adapted to receive a cover member therein disposed on the obverse side thereof, said main body also having a pair of spaced mount hooks each having an upwardly extending tip, disposed on the reverse side of the back panel for engagement with a pair of upper bores in a vehicle door, and said back panel having a pair of spaced through bores spaced down from the hooks;

said main body being a further attachable to the vehicle door by the placement of rotatable tab pegs, each of which pegs has a distal end boss disposed at an offset angle, through the spaced through bores of the back panel of said main body, into suitable aligned lower bores;

a cover member adapted in size to be received within the confines of the forwardly extending framework, said cover member comprising an impact receiving layer having a removable means of attachment to the back panel on one side thereof.

2. The device of claim 1 wherein the means of attachment for the cover member to the back panel is a hook and loop fastener.

3. The device of claim 1 wherein the means of attachment for the cover member to the back panel is a layer of releasable adhesive.

4. The device of claim 1 wherein the impact-receiving layer of the cover member is polyurethane, selected from the group consisting of sheeting of foam and elastomer.

5. The device of claim 1 wherein the main body is made of plastic.

6. The device of claim 1 wherein the main body is made of metal.

7. The device of claim 1 wherein the main body is color matched to the vehicle interior.

8. The device of claim 1 further including a pair of spaced recesses in said back panel obverse surface, one each aligned with one of said through bores of said back panel.

9. A device to aid a person to open a vehicle door, and which device is to be attached to the upholstered vehicle door or to a pocket mounted on said door which device comprises:

a main body comprising a back panel having an obverse and a reverse side surface, with an integrally formed forwardly extending peripheral framework adapted to receive a cover member therein disposed on the obverse side thereof, said main body also having a pair of spaced mount hooks each having an upwardly extending tip, disposed on the reverse side of the back panel for engagement with a pair of upper bores in a vehicle door, and said back panel having a pair of spaced through bores spaced down from the hooks each of which through bores is set into a recess on the obverse side of said back panel;

said main body being a further attachable to the vehicle door by the placement of rotatable tab pegs, each of which pegs has a distal end boss disposed at an offset angle, through the spaced through bores of the back panel of said main body, into suitable aligned lower bores;

a cover member adapted in size to be received within the confines of the forwardly extending framework, said cover member comprising an impact receiving layer having a layer of releasable adhesive thereon for attachment to the back panel on one side thereof.

10. The device of claim 9 wherein the main body is made of plastic.

11. The device of claim 9 wherein each peg's head is bendable along a score line, to fit flush in the respective recess.

12. The process for attaching a foot impact-receiving device to a vehicle door or door pocket having spaced upper bores and spaced lower bores therein which comprises:

[a] attaching a device having a main body with an obverse side and a reverse side, a pair of spaced through bores and having a pair of spaced rearwardly extending mount hooks, each having an upwardly extending tip, on the reverse side by inserting said hooks into the upper spaced bores,

[b] inserting a pair of rotatable tab pegs through the main body into the lower spaced bores,

[c] rotating said tab pegs having the distal end boss, such that said tabs extend downwardly to lock said main body to said vehicle door or door pocket,

[d] removably attaching an impact-receiving layer to said main body.

* * * * *